United States Patent [19]
Kraemer et al.

[11] Patent Number: 5,479,775
[45] Date of Patent: Jan. 2, 1996

[54] AIR-COMPRESSING FUEL-INJECTION INTERNAL-COMBUSTION ENGINE WITH AN EXHAUST TREATMENT DEVICE FOR REDUCTION OF NITROGEN OXIDES

[75] Inventors: Michael Kraemer, Notzingen; Friedrich Wirbeleit, Ruedern; Christian Enderle, Baltmannsweiler; Walter Friess, Stuttgart; Bernd Krutzsch, Denkendorf; Gert Withalm, Ebersbach; Christof Schoen, Weinstadt; Leopold Mikulic, Aichwald; Gernot Hertweck, Fellbach; Frank Thoma, Stuttgart, all of Germany

[73] Assignee: Mercedes-Benz AG, Stuttgart, Germany

[21] Appl. No.: 232,807

[22] Filed: Apr. 25, 1994

[30] Foreign Application Priority Data

Apr. 23, 1993 [DE] Germany ........................ 43 13 348.7

[51] Int. Cl.$^6$ .................................................. F01N 3/20
[52] U.S. Cl. ............................................. 60/274; 60/285
[58] Field of Search ............................. 60/274, 285, 280

[56] References Cited

U.S. PATENT DOCUMENTS

| | | |
|---|---|---|
| 4,132,209 | 1/1979 | Resler, Jr. . |
| 4,452,040 | 6/1984 | Kobashi ..................................... 60/285 |
| 4,565,065 | 1/1986 | Kimura ...................................... 60/285 |
| 4,685,290 | 8/1987 | Kamiya ..................................... 60/274 |
| 5,343,702 | 9/1994 | Miyajima ................................... 60/285 |

FOREIGN PATENT DOCUMENTS

| | | |
|---|---|---|
| 0070619 | 1/1983 | European Pat. Off. . |
| 0488386 | 6/1992 | European Pat. Off. . |
| 2196058 | 4/1988 | United Kingdom . |

OTHER PUBLICATIONS

Patent Abstracts of Japan vol. 14, No. 174 (M–959) (4117) 5. Apr. 1990 & JP-A-02 027 117 (Agency of Ind. Science & Technol.) 29. Jan. 1990.

Primary Examiner—Douglas Hart
Attorney, Agent, or Firm—Evenson McKeown Edwards & Lenahan

[57] ABSTRACT

The invention relates to a diesel internal combustion engine with an exhaust treatment device for the reduction of nitrogen oxides and with a fuel injection system comprising a high-pressure pump and at least one solenoid valve-controlled injection nozzle. The injection nozzle is actuated by an electronic control unit and is intended both for the primary injection, provided for the combustion, and for the additional injection, influencing the effectiveness of the exhaust treatment device. The fuel injection nozzle provided for the primary injection also provides for the secondary injection. The secondary injection takes place as a supplementary injection at the earliest in the region of the end phase of the combustion after the ignition top dead center.

18 Claims, 3 Drawing Sheets

AIR-COMPRESSING FUEL-INJECTION INTERNAL-COMBUSTION ENGINE WITH AN EXHAUST TREATMENT DEVICE FOR REDUCTION OF NITROGEN OXIDES

BACKGROUND AND SUMMARY OF THE INVENTION

The invention relates to an air-compressing fuel injection internal-combustion engine with an exhaust treatment device, to which reduction agents for the reduction of nitrogen oxides can be fed.

EP 0 488 386 A1 discloses an internal-combustion engine with an exhaust treatment device reducing nitrogen oxides and with a fuel injection system comprising a high-pressure pump and at least one injection nozzle and with fuel or primary injection into the combustion chamber of the engine. For the purpose of nitrogen oxide reduction, liquid hydrocarbon taken from a reservoir is injected as a reduction agent by means of an additional injection nozzle opening out into the induction pipe. According to FIG. 7, this additional injection nozzle is connected by a line to a main injection nozzle, provided for the primary injection. In this case, the main injection nozzle and additional injection nozzle are intended for different cylinders of the engine.

The primary injection into the combustion chamber of the engine, intended for the combustion, takes place through the main injection nozzle, while the secondary or additional injection, serving for nitrogen oxide reduction, takes place into the air induction pipe through the additional injection nozzle at the point in time of the overlap top dead center, at which inlet valve and outlet valve are simultaneously opened for a short time.

An object of the invention is to use measures which are more simple, constructionally less demanding and more effective with regard to consumption on an internal-combustion engine of the generic type to meet also the more stringent requirements in future with regard to the percentages of pollutants in the exhaust, in particular nitrogen oxides.

This object is achieved according to the invention by providing an arrangement wherein the primary injection for combustion and the secondary or supplemental injection for reduction of nitrogen oxides is made through the same injection nozzle at respective times during the operating cycle.

Beneficial further developments of the invention are further specified in the subclaims.

Due to the fact that not only the primary injection intended for combustion is performed into the combustion chamber of the engine, but also a secondary or additional injection, effecting the rapid activation of the exhaust treatment device for the reduction in the nitrogen oxides, is performed as an early or late supplementary injection into this combustion chamber by a single fuel injection nozzle, a design which is significantly less demanding in terms of production and construction is achieved, in which the single fuel injection nozzle is actuated twice within an operating cycle of the engine with a defined time interval or, in the case of a design with pre-injection and main injection, is actuated three times.

The additional injection as an early supplementary injection takes place in the region of the end phase of the combustion between 20° and 80° after ignition top dead center; the fuel, for example diesel fuel, as an "early" supplementary injection thus occurs at a point in time at which the combustion from the primary injection is at least largely complete. The combustion chamber temperatures must be high enough that the amount of fuel to be supplementarily injected burns as completely as possible. This additionally introduced amount of fuel serves exclusively for the desired increasing of the exhaust temperature before the catalytic converter.

On the other hand, the additional injection as a late supplementary injection does not participate in the combustion and commences at a point in time between 80° after ignition top dead center and the bottom dead center region, at which the fuel does not burn, but evaporates, cracks and mixes with air and the combustion gases, the $NO_x$ molecules being reduced whilst still in the combustion chamber in the hot gas and flowing to the exhaust treatment device, a denox catalytic converter, for example formed by a zeolith or perovskite catalyst.

In the denox catalytic converter, reactions form between the $NO_x$ molecules and the highly reactive hydrocarbon fractions or readily reacting radicals, which results in reduction of the $NO_x$ molecules in the nitrogen and oxygen. The additional injection is appropriate in particular in the case of injection systems which operate on the basis of the common-rail principle, since there are always high pressures available in the accumulator system, which have advantageous effects on the quality of atomization even in the case of the additional injection.

However, so-called electronically actuated unit fuel injectors can also be used for the additional injection. The additional injection is suitable both for pre-chamber and swirl-chamber internal-combustion engines and for direct-injection internal-combustion engines and can also be used in the case of injection systems with pre injection and main injection.

Due to the nitrogen oxide-reducing measures in the case of the late supplementary injection, important parameters can be freely set or selected, such as the amount of reduction agent, the point in time of its introduction and the level of the pressure, whereby the preparation of the reduction agent can be optimized with regard to the rates of reduction.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
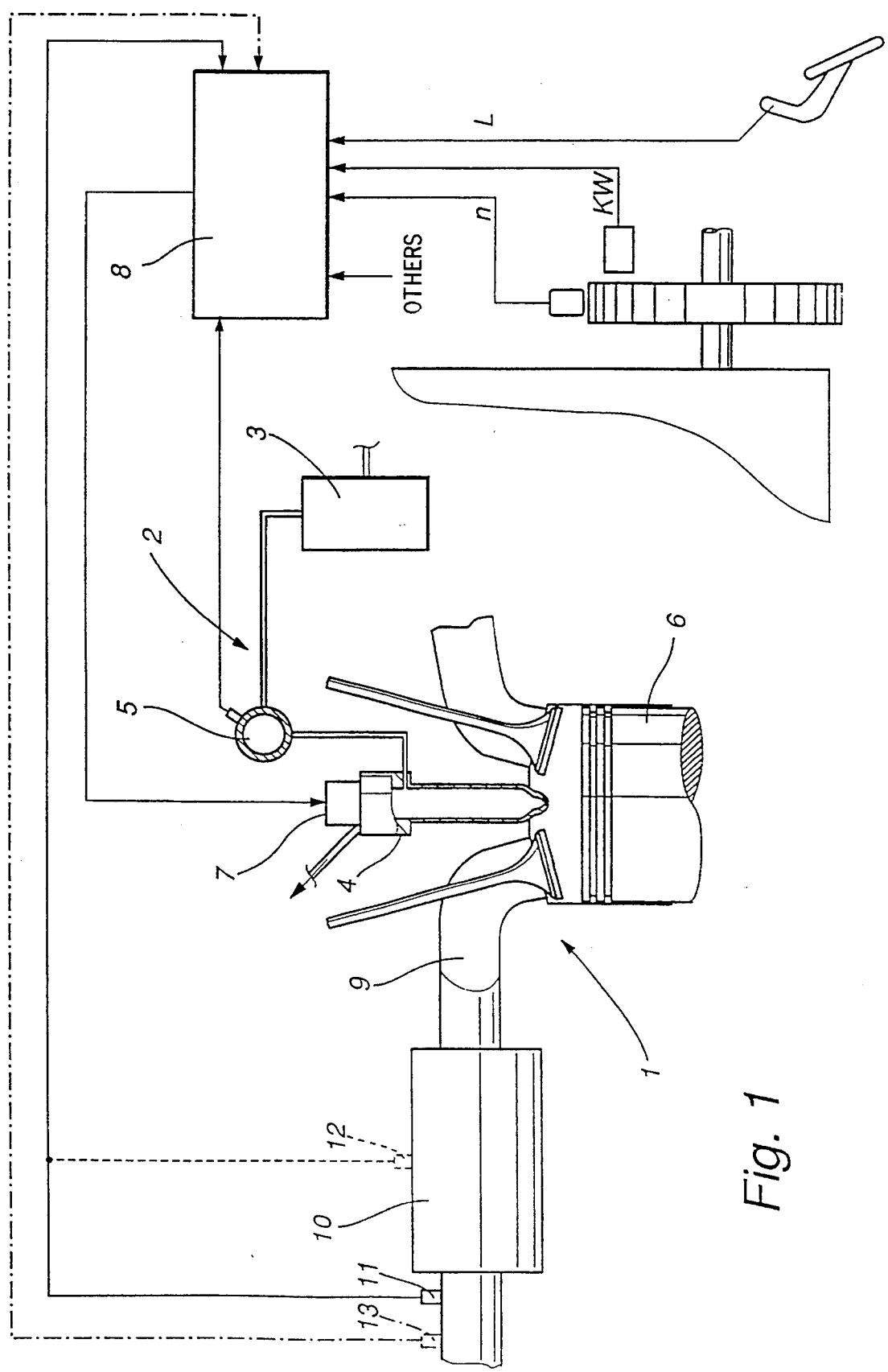
FIG. 1 is a schematic view which shows an internal-combustion engine with an injection nozzle protruding into the combustion chamber for a primary injection and for a secondary supplementary injection, constructed according to preferred embodiments of the invention.

A multi-cylinder air-compressing fuel-injection internal-combustion engine 1 has a fuel injection system 2, which operates on the basis of the common-rail system and comprises a high-pressure pump 3 and, for example, four solenoid valve-controlled injection nozzles 4, which are all connected to a distribution pipe 5. Distribution pipe 5 acts as an accumulator and fuel delivered thereto by the high-pressure pump 3, namely diesel fuel, is kept at a high pressure level for the primary injection and for the secondary or additional injection, following after a time interval, per cylinder 6.

The actuation of the solenoid valves 7 interacting with the injection nozzles 4 takes place by means of a control unit 8, operating in dependence on operating parameters. The amount of the additional injection is, for example, less than 2% of the amount of injection of the primary injection, the injection pressure lying distinctly above the combustion chamber pressure. Envisaged as input variables are, for example, the rotational speed n, load L, crank angle KW and other parameters. Each injection nozzle 4 is actuated twice per operating cycle, i.e., the first actuation determines the amount of injection of the primary injection, provided for the combustion, and the second actuation determines the amount of injection of the secondary or additional injection, required for the exhaust temperature increase or for the nitrogen oxide reduction, this supplementary injection trailing the primary injection, in dependence on the operating parameters, as an early or late supplementary injection, which will be discussed in more detail below.

Depending on requirements and the design of the exhaust treatment device, instead of an additional injection per operating cycle for all the cylinders it may also be possible if appropriate for a cyclical injection to be carried out, i.e., additional injection only every second, third or xth operating cycle, the additional injection being able to take place only at selected cylinders, which are then switched over into a particular control cycle.

In the exhaust system, tile $NO_x$-containing exhaust gases pass into an exhaust treatment device, which is arranged in the exhaust pipe 9, is designed as a denox catalytic converter 10 and in which hydrocarbon fractions or radicals reduce the existing $NO_x$ values. Zeoliths, perovskites or precious metal-containing catalysts can be used, for example, as the denox catalytic converter. Arranged downstream of the denox catalytic converter 10 is a sensor 11, which senses the exhaust temperature $T_{Abg}$ after the characteristic of the exhaust gases has been smoothed by the catalytic converter, and enters the corresponding signals as input values into the control unit 8. Instead of this sensor 11, a sensor 12 sensing the component temperature of the denox catalytic converter 10 may also be provided (represented by interrupted lines in FIG. 1). Furthermore, in addition to the sensor 11 sensing the exhaust temperature, a further sensor 13 may also be used for the sensing of hydro carbons (HC) and/or nitrogen oxides ($NO_x$), which permits a finer adjustment of the late supplementary injection for the purposes of improved emission quality (represented by dot-dashed lines in FIG. 1).

The early and late supplementary injection is controlled in dependence on operating parameters in the engine characteristic map and automatically controlled on the basis of the exhaust temperature, which takes place by early supplementary injection being carried out after a cold start even while the engine is still idling. In this case, starting from a basic setting stored in the electronic control, first of all the point in time of the injection is adjusted, while keeping a small constant amount of injection, until the exhaust temperature sensor 11 measures the highest exhaust temperature. Subsequently, the desired, and generally higher, set point temperature after the catalytic converter is set by adapting or increasing the amount of the supplementary injection. If the optimum exhaust temperature is exceeded, for example if there is a higher engine output with a correspondingly higher exhaust temperature, the catalyst heating function of the injection system is immediately switched off. The late supplementary injection is not activated until the exhaust temperature exceeds a certain limit value, and is switched off whenever a defined high exhaust temperature is reached, at which in any case no $NO_x$-reducing influence is possible any longer in the catalytic converter.

If appropriate, a combination of the described early and late supplementary injections may also be desirable, which means that the point in time of the supplementary injection is chosen such that only part of the supplementarily injected fuel is burned, and the exhaust temperature increases and the residual fuel remains unburned and consequently is available as a prepared reduction agent in the catalytic converter.

Figure 2:
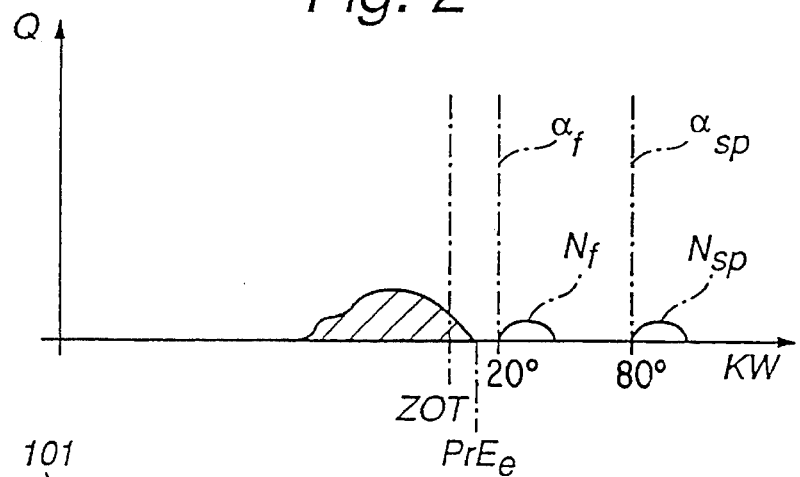
FIG. 2 shows a graphic representation of the crank angle-dependent early or late supplementary injection, according to preferred embodiments of the invention.

In FIG. 2, the rotation of the crankshaft of an internal combustion engine is plotted in degrees of crank angle (° KW) on the x-axis of the diagram and the amount of fuel Q is plotted on the y-axis. In the diagram, an early supplementary injection is denoted by $N_f$ and a late supplementary injection is denoted by $N_{sp}$, where $\alpha_f$ denotes the position of the beginning of the early supplementary injection and $\alpha_{sp}$ denotes the position of the beginning of the late supplementary injection, in each case after the ignition top dead center (ITDC). $\alpha_f$ and $\alpha_{sp}$ are dependent on the speed and load of the engine. $\alpha_f$ may commence, for example, in the region between 20° . . . 80° KW after ITDC on condition that the exhaust temperature lies below a defined limit value between 150° . . . 200°, whereas $\alpha_{sp}$ may occur in the region between 80° . . . 180° KW on condition that the exhaust temperature has exceeded a certain limit value between 200° . . . 300° C. The early and late supplementary injections follow with a time interval the end of the primary injection $PrE_e$.

Figure 3:
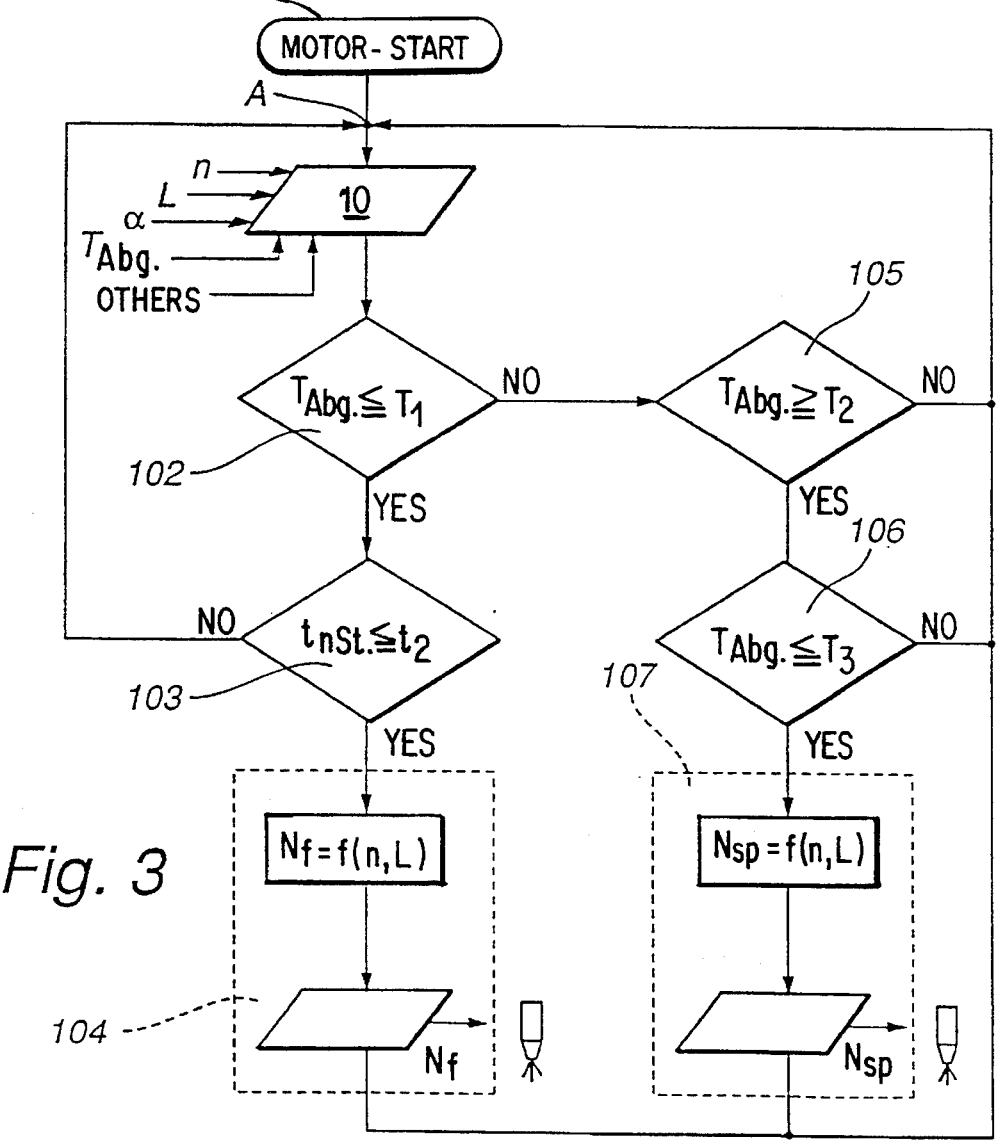
FIG. 3 shows a flow diagram representing the early and late supplementary injection, according to preferred embodiments of the invention.

The flow diagram shown in FIG. 3 and described below for representing the mode of operation of the electronic control unit does not relate to the primary injection but only to the "early" and "late" supplementary injection.

After the starting 101 of the engine, in the input block 10 the current values of the engine are sensed, such as rotational speed n, load L, crank angle $\alpha$, exhaust temperature $T_{Abg}$ and other values.

Figure 4:
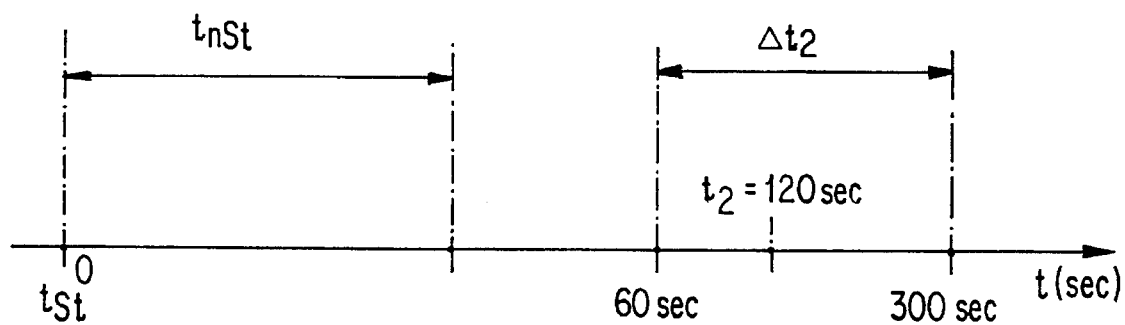
FIG. 4 shows a time axis t with the starting time $t_{St}$, the time span $t_{nSt}$ and the time limit value $t_2$, according to preferred embodiments of the invention.
Figure 5:
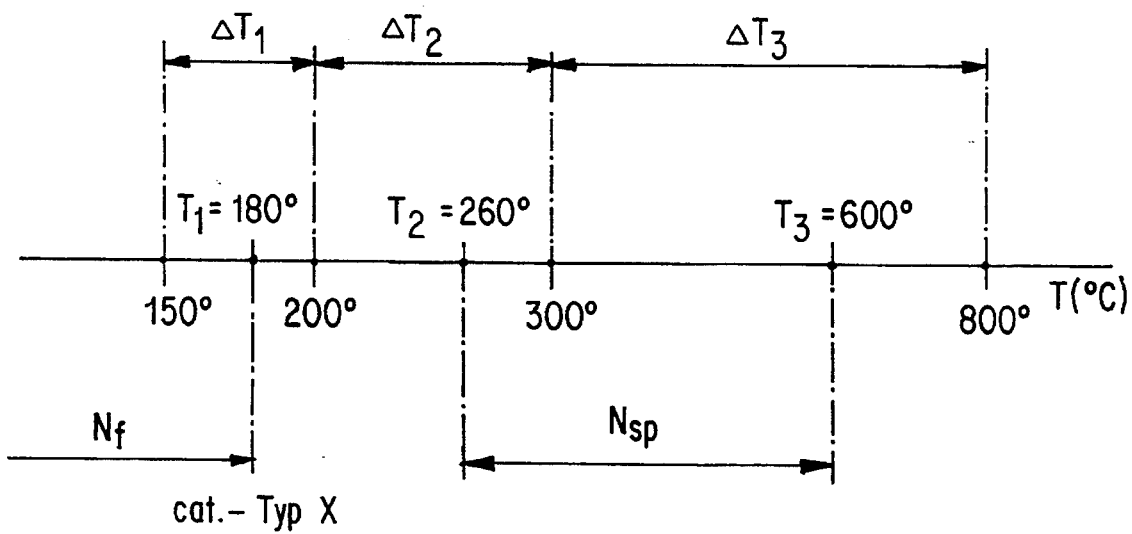
FIG. 5 shows a temperature axis with the three limit values $T_1$, $T_2$, $T_3$ for the respective supplementary injections, according to preferred embodiments of the invention.

In the branch block 102 it is checked whether the exhaust temperature $T_{Abg}$ lies below a limit value $T_1$. This limit value $T_1$ is fixed in dependence on the type of catalyst and, corresponding to $\Delta T_1$ in FIG. 5, may lie between about 150° C. and 200° C. For the catalyst specified by way of example in FIG. 5, "cat. type x", the limit value $T_1$ is at 180°. If the engine still has not reached its operating temperature, and consequently $T_{Abg} \leq T_1$, the control branches to the branch block 103. In the event that here a certain time span $t_{nSt}$ after the starting time $t_{St}$ of the engine has exceeded the limit value $t_2$, the control branches to the point "A" for renewed input of the operating parameters in the block 10. This time limit value $t_2$ may be fixed in dependence on the engine type and, corresponding to $\Delta t_2$ in FIG. 4, lie between about 60 and 300 seconds.

If, however, it emerges from the time in question that the time limit value $t_2$ has not yet been exceeded, in the following block 104 an "early supplementary injection" is performed for the purpose of rapidly increasing the temperature of the exhaust gases, which takes place by first of all the early supplementary injection $N_f$ being finally set or modified in the block 104 in dependence on operating points, such as rotational speed n and load L with respect to the beginning of injection, the duration and amount of injection, and the injection nozzle is actuated in a way corresponding to this determined value. According to FIG. 2, the early supplementary injection $N_f$ begins at the earliest in the region of the end phase of the combustion of the primary injection $PrE_e$, namely at about 20° after ITDC or at the latest at about 80° after ITDC. Consequently, the activation of the catalyst heating takes place in the block 104 and is maintained until the respectively new passage from point A through the block 102 and/or block 103 is interrupted at a point in time when the exhaust temperature $T_{Abg}$ lies above a limit value $T_1$ and/or a time limit value $t_2$. The control branches to the branch block 105, in which it is checked whether $T_{Abg}$ has exceeded a limit value $T_2$, which may also be fixed in dependence on the type of catalyst and, corresponding to $\Delta T_2$ in FIG. 5, lies between 200° C. and 300° C. If not, there is no need for a "late" supplementary injection. The branching to the point "A" takes place for renewed input via block 102 again to the block 105. If here the limit value for example of $T_2=260°$ C. is exceeded, in the following block 106 it is checked whether $T_{Abg}$ has not yet reached a second limit value $T_3$, which, corresponding to $T_3$ in FIG. 5, lies in a region between about 300° C. and 800° C., the lower limit value $T_2$ and the upper limit value $T_3$ having to be an appropriate distance apart, for example a temperature difference of 100° C. If the condition is met, namely $T_2$ has been exceeded and $T_3$ has not yet been reached, in the following block 107 first of all the late supplementary injection $N_{Sp}$ is finely set in dependence on operating points, such as rotational speed n and load L with regard to the beginning of injection, the duration and amount of injection. The injection nozzle is actuated by the correspondingly determined values.

In the block 106, the activation of the denox catalytic converter consequently takes place. The late supplementary injection in this case serves exclusively as a prepared $NO_x$ reduction agent for the downstream catalytic converter.

If, however, $T_{Abg}$ is greater than $T_3$, the branching to the point A takes place for renewed input. The late supplementary injections are consequently no longer active.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An air compressing fuel-injection type internal combustion engine arrangement comprising:

a variable volume combustion chamber which provides for engine operating cycles with compression, ignition, expansion and exhaust of a fuel and air mixture supplied to the combustion chamber, an exhaust treatment device for supplying reducing agents to reduce nitrogen oxides in the exhaust from the combustion chamber, a temperature sensor for sensing the temperature in the region of the exhaust treatment device, to thereby control operation of the exhaust treatment device, and a fuel injection system including a high pressure pump and a fuel injection nozzle opening to the combustion chamber, said fuel injection system providing for primary fuel injection through the fuel injection nozzle to the combustion chamber during a first stage of the engine operating cycle to facilitate primary combustion in said combustion chamber and providing for secondary fuel injection to the combustion chamber during a second stage of the engine operating cycle to affect the effectiveness of the exhaust treatment device, wherein said secondary fuel injection is provided as a supplementary fuel injection by way of the same fuel injection nozzle as the primary fuel injection and spaced by a time interval from the primary fuel injection with the supplementary fuel injection occurring at the earliest toward the end of the combustion phase after ignition top dead center in the combustion chamber, and wherein the supplementary injection which follows the primary injection with a time interval within an operating cycle, is merely a nitrogen oxide reducing late supplementary injection, which takes place between 80° after ignition top dead center and the bottom dead center operation of the combustion chamber.

2. Internal-combustion engine arrangement according to claim 1, wherein the fuel used for the primary injection is also provided for the supplementary injection.

3. Internal-combustion engine arrangement according to claim 1, wherein the sensor sensing the temperature is arranged in the exhaust flow downstream of the exhaust treatment device.

4. Internal-combustion engine arrangement according to claim 1, wherein the sensor sensing the temperature senses the component temperature of the exhaust treatment device.

5. Internal-combustion engine arrangement according to claim 1, wherein the injection pressure of the supplementary injection lies distinctly above the maximum combustion chamber pressure.

6. Internal-combustion engine arrangement according to claim 1, wherein the amount of injection of the supplementary injection is substantially less than that of the primary injection provided for the combustion.

7. Internal-combustion engine arrangement according to claim 1, wherein the additional injection is provided for a fuel injection system operating on the basis of one of a common-rail system and an electronically actuated unit fuel injector.

8. An air compressing fuel-injection type internal combustion engine arrangement comprising:

a variable volume combustion chamber which provides for engine operating cycles with compression, ignition, expansion and exhaust of a fuel and air mixture supplied to the combustion chamber, an exhaust treatment device for supplying reducing agents to reduce nitrogen oxides in the exhaust from the combustion chamber, a temperature sensor for sensing the temperature in the region of the exhaust treatment device, to thereby control operation of the exhaust treatment device, and a fuel injection system including a high pressure pump and a fuel injection nozzle opening to the combustion chamber, said fuel injection system providing for primary fuel injection through the fuel injection nozzle to the combustion chamber during a first stage of the engine operating cycle to facilitate primary combustion in said combustion chamber and providing for secondary fuel injection to the combustion chamber during a second stage of the engine operating cycle to affect the effectiveness of the exhaust treatment device, wherein said secondary fuel injection is provided as a supplementary fuel injection by way of the same fuel injection nozzle as the primary fuel injection and spaced by a time interval from the primary fuel injection with the supplementary fuel injection occurring at the earliest toward the end of the combustion phase after ignition top dead center in the combustion chamber, and wherein the supplementary injection is merely an exhaust temperature-increasing early supplementary injection, which commences directly after the starting of the engine in the region between 20° and 80° after ignition top dead center operation and can be switched off at a predetermined time.

9. Internal-combustion engine arrangement according to claim 8, wherein the injection pressure of the supplementary injection lies distinctly above the maximum combustion chamber pressure.

10. Internal-combustion engine arrangement according to claim 8, wherein the amount of injection of the supplementary injection is less than that of the primary injection provided for the combustion.

11. Internal-combustion engine arrangement according to claim 8, wherein the additional injection is provided for a fuel injection system operating on the basis of one of a common-rail system and an electronically actuated unit fuel injector.

12. Internal combustion engine arrangement according to claim 8, wherein said predetermined time is $t_{nSt}$=60 to 300 seconds.

13. A method of operating an air-compressing fuel-injection type internal combustion engine arrangement comprising:

a variable volume combustion chamber which provides for engine operating cycles with compression, ignition, expansion and exhaust of a fuel and air mixture supplied to the combustion chamber, an exhaust treatment device for supplying reducing agents to reduce nitrogen oxides in the exhaust from the combustion chamber, a temperature sensor for sensing the temperature in the region of the exhaust treatment device, to thereby control operation of the exhaust treatment device, and a fuel injection system including a high pressure pump and a fuel injection nozzle opening to the combustion chamber, said method comprising providing for primary fuel injection through the fuel injection nozzle to the combustion chamber during a first stage of the engine operating cycle to facilitate primary combustion in said combustion chamber and providing for secondary fuel injection to the combustion chamber during a second stage of the engine operating cycle to affect the effectiveness of the exhaust treatment device, wherein said secondary fuel injection is provided as a supplementary fuel injection by way of the same fuel injection nozzle as the primary fuel injection and spaced by a time interval from the primary fuel injection with the supplementary fuel injection occurring at the earliest toward the end of the combustion phase after ignition top dead center in the combustion chamber, and wherein the supplementary injection which follows the primary injection with a time interval within an operating cycle, is merely a nitrogen oxide reducing late supplementary injection, which takes place between 80° after ignition top dead center and the bottom dead center operation of the combustion chamber.

14. A method according to claim 13, wherein the fuel used for the primary injection is also provided for the supplementary injection.

15. A method according to claim 13, wherein the injection pressure of the supplementary injection lies distinctly above the maximum combustion chamber pressure.

16. A method of operating an air-compressing fuel-injection type internal combustion engine arrangement comprising:

a variable volume combustion chamber which provides for engine operating cycles with compression, ignition, expansion and exhaust of a fuel and air mixture supplied to the combustion chamber, an exhaust treatment device for supplying reducing agents to reduce nitrogen oxides in the exhaust from the combustion chamber, a temperature sensor for sensing the temperature in the region of the exhaust treatment device, to thereby control operation of the exhaust treatment device, and a fuel injection system including a high pressure pump and a fuel injection nozzle opening to the combustion chamber, said method comprising providing for primary fuel injection through the fuel injection nozzle to the combustion chamber during a first stage of the engine operating cycle to facilitate primary combustion in said combustion chamber and providing for secondary fuel injection to the combustion chamber during a second stage of the engine operating cycle to affect the effectiveness of the exhaust treatment device, wherein said secondary fuel injection is provided as a supplementary fuel injection by way of the same fuel injection nozzle as the primary fuel injection and spaced by a time interval from the primary fuel injection with the supplementary fuel injection occurring at the earliest toward the end of the combustion phase after ignition top dead center in the combustion chamber, and wherein the supplementary injection is merely an exhaust temperature-increasing early supplementary injection, which commences directly after the starting of the engine in the region between 20° and 80° after ignition top dead center operation and can be switched off at a predetermined time.

17. A method according to claim 16, wherein wherein said predetermined time is $t_{nSt}$=60 to 300 seconds.

18. A method according to claim 16, wherein the injection pressure of the supplementary injection lies distinctly above the maximum combustion chamber pressure.

\* \* \* \* \*